United States Patent
Yasuda (10) Patent No.: US 10,802,460 B2
(45) Date of Patent: Oct. 13, 2020

(54) CONTROLLER FOR OSCILLATION CUTTING

(71) Applicant: FANUC CORPORATION, Minamitsuru-gun, Yamanashi (JP)

(72) Inventor: Masashi Yasuda, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 16 days.

(21) Appl. No.: 16/156,344

(22) Filed: Oct. 10, 2018

(65) Prior Publication Data

US 2019/0107820 A1 Apr. 11, 2019

(30) Foreign Application Priority Data

Oct. 11, 2017 (JP) .................. 2017-197367

(51) Int. Cl.
*G05B 19/18* (2006.01)

(52) U.S. Cl.
CPC .. *G05B 19/182* (2013.01); *G05B 2219/37002* (2013.01); *G05B 2219/37336* (2013.01); *G05B 2219/49314* (2013.01)

(58) Field of Classification Search
None
See application file for complete search history.

(56) References Cited

U.S. PATENT DOCUMENTS

| | | | | |
|---|---|---|---|---|
| 4,961,041 A | * | 10/1990 | Seki | ........................ G05B 19/41 |
| | | | | 318/572 |
| 5,019,115 A | | 5/1991 | Schneider et al. | |
| 5,079,490 A | * | 1/1992 | Kita | ........................ G05B 19/232 |
| | | | | 318/565 |
| 2014/0102268 A1 | | 4/2014 | Hariki et al. | |
| 2017/0075337 A1 | | 3/2017 | Kameta et al. | |
| 2017/0308059 A1 | * | 10/2017 | Ono | ........................ G05B 19/4093 |

FOREIGN PATENT DOCUMENTS

| | | |
|---|---|---|
| JP | S432685 Y | 2/1968 |
| JP | S4917790 B | 5/1974 |
| JP | 05301148 A | 11/1993 |
| JP | H1034401 A | 2/1998 |
| JP | 11327624 A | 11/1999 |
| JP | 2013103279 A | 5/2013 |
| JP | 2016194860 A | 11/2016 |
| JP | 2017-56515 A | 3/2017 |
| JP | 2017177267 A | 10/2017 |
| WO | 2015140906 A1 | 9/2015 |

OTHER PUBLICATIONS

Notice of Reasons for Refusal for Japanese Application No. 2017-197367, dated Aug. 27, 2019, with translation, 8 pages.
Japanese Decision to Grant a Patent for Japanese Application No. 2017-197367, dated Mar. 17, 2020, with translation, 5 pages.

* cited by examiner

*Primary Examiner* — Ryan A Jarrett (74) *Attorney, Agent, or Firm* — RatnerPrestia (57) ABSTRACT

A controller has a function of stopping an oscillation motion in a non-cutting section in oscillation cutting and includes an oscillation command creation unit and an oscillation command creation determination unit. The oscillation command creation unit outputs an oscillation command, and the oscillation command creation determination unit determines whether or not cutting of a workpiece by a tool is actually being performed and stops an output of the oscillation command during non-cutting.

6 Claims, 6 Drawing Sheets

CONTROLLER FOR OSCILLATION CUTTING

CROSS-REFERENCE TO RELATED APPLICATION

This application is a new U.S. Patent Application that claims benefit of Japanese Patent Application No. 2017-197367, filed Oct. 11, 2017, the disclosure of this application is being incorporated herein by reference in its entirety for all purposes.

BACKGROUND OF THE INVENTION

1. Field of the Invention

The present invention relates to a controller, and in particular, relates to a controller having a function of stopping an oscillation motion in a non-cutting section during oscillation cutting.

2. Description of the Related Art

In order to subdivide chips generated when cutting a workpiece, a technique of performing cutting while oscillating a cutting tool relative to a workpiece is called oscillation cutting (also referred to as vibration cutting or intermittent cutting). For example, Japanese Patent Application Laid-Open No. 2017-56515 describes a controller that implements oscillation cutting by adding to a machining command an oscillation command having a oscillating frequency that is asynchronous with respect to a rotation speed around a rotation axis and a oscillating amplitude capable of intermittently cutting a workpiece with a tool and driving a servo motor.

Changes in acceleration that occur with great frequency at the time of oscillation cutting can put the drive mechanism of the machine under a load, which can also cause vibration of the entire machine. As a result, problems such as noise and damage to parts of the machine may be caused. In addition, the vibration of a workpiece or a tool caused by oscillation cutting may affect the machining accuracy of other machining that is being performed at the same time (for example, drilling by another system).

In order to solve such a problem, it is necessary to suppress unnecessary oscillating. Since oscillation cutting is aimed at subdividing chips, the influence can be suppressed by oscillating only when cutting is actually performed. However, it is extremely difficult for the user to determine whether or not cutting is performed and to finely set the oscillation command. Even if it is possible to finely set validity/invalidity of the oscillation function by a program command, other problems such as an increase in cycle time may occur.

SUMMARY OF THE INVENTION

The present invention is made to solve such problems and an object thereof is to provide a controller having a function of stopping an oscillation motion in a non-cutting section during oscillation cutting.

A controller according to the present invention performs oscillation cutting and includes: an oscillation command creation unit that outputs an oscillation command; and an oscillation command creation determination unit that determines whether or not cutting of a workpiece by a tool is actually being performed, and stops an output of the oscillation command during non-cutting.

The controller may further include a cut path storage unit that stores a cut path on which cutting has been completed, and the oscillation command creation determination unit may stop the output of the oscillation command when a tool path and the cut path overlap with each other.

The controller may further include a retrace start position storage unit that stores a block number of a machining program being executed at a time of starting backward movement and a coordinate value of a retrace start point, and the oscillation command creation determination unit may stop the output of the oscillation command when a tool path and a cut path identified by the block number and the coordinate value overlap with each other.

The oscillation command creation determination unit may stop the output of the oscillation command when a tool position reaches the cut path.

The oscillation command creation determination unit may determine whether or not cutting is actually being performed based on a value indicating a state of a machine.

According to the present invention, a controller having a function of stopping an oscillation motion in a non-cutting section during oscillation cutting can be provided.

BRIEF DESCRIPTION OF THE DRAWINGS

The above object and other objects and the features of the present invention will be apparent from the description below with reference to appended drawings. Among these drawings.

DETAILED DESCRIPTION OF THE PREFERRED EMBODIMENTS

Figure 1:
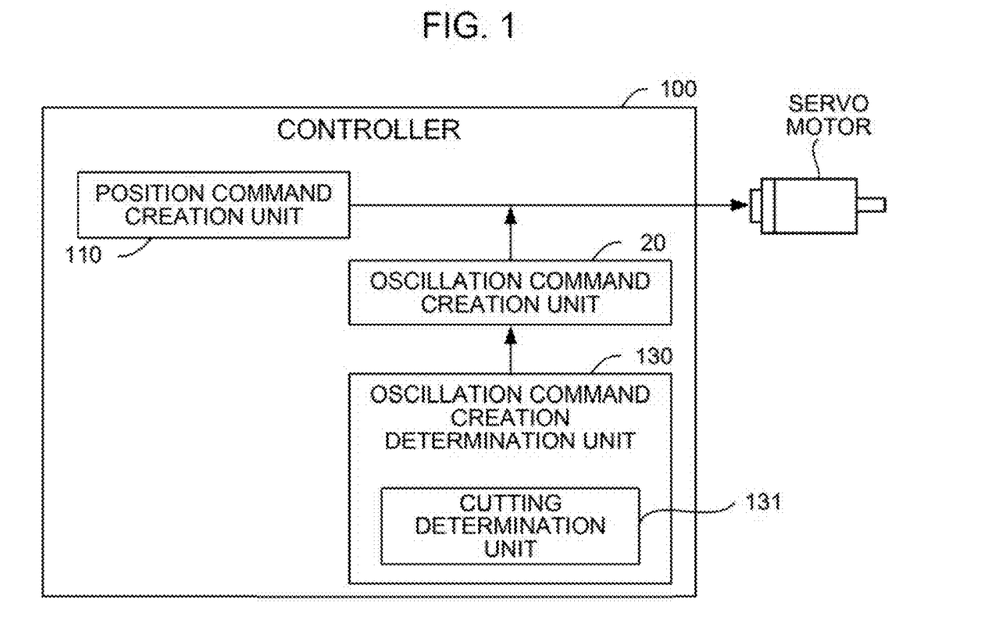
FIG. 1 is a block diagram showing a functional configuration of a controller.

A controller 100 according to an embodiment of the present invention will be described with reference to the drawings. FIG. 1 is a block diagram showing a functional configuration of the controller 100.

The controller 100 includes a position command creation unit 110 that generates a position command according to a machining program, an oscillation command creation unit 120 that creates an oscillation command for oscillation cutting, and an oscillation command creation determination unit 130 that determines whether or not the creation of an oscillation command is necessary. A typical controller 100 includes a central processing unit (CPU), a storage device, an input/output device and the like and the position command creation unit 110, the oscillation command creation unit 120, and the oscillation command creation determination unit 130 are logically implemented by the execution of programs stored in the storage device by the CPU.

The position command creation unit 110 creates and outputs a position command indicating a tool path according to an analysis result of a machining program by a machining program analysis unit (not shown). The creation of a position command is a well-known technique and therefore, a detailed description thereof is omitted here.

The oscillation command creation unit 120 creates and outputs an oscillation command that is to be added to a position command. The creation of an oscillation command can be implemented by the method described in, for example, Japanese Patent Application Laid-Open No. 2017-56515. The oscillation command is added to the position command output by the position command creation unit 110, and the added command drives a servo motor to implement oscillation cutting.

The oscillation command creation determination unit 130 determines whether or not the tool is actually cutting a workpiece during the execution of the oscillation cutting and, if it is determined that the workpiece is not being cut, stops the creation of an oscillation command. That is, the oscillation command creation determination unit 130 temporarily stops the operation of the oscillation command creation unit 120. Accordingly, even during the oscillation cutting operation, the oscillation command is not output and the oscillating of the tool is stopped while the cutting is actually not performed (for example, in a backward movement).

The oscillation command creation determination unit 130 includes a cutting determination unit 131 that determines whether or not the tool is actually cutting a workpiece. The cutting determination unit 131 can determine whether or not cutting is being performed by any method, but three determination methods will be exemplified as embodiments below.

First Embodiment

Figure 2:
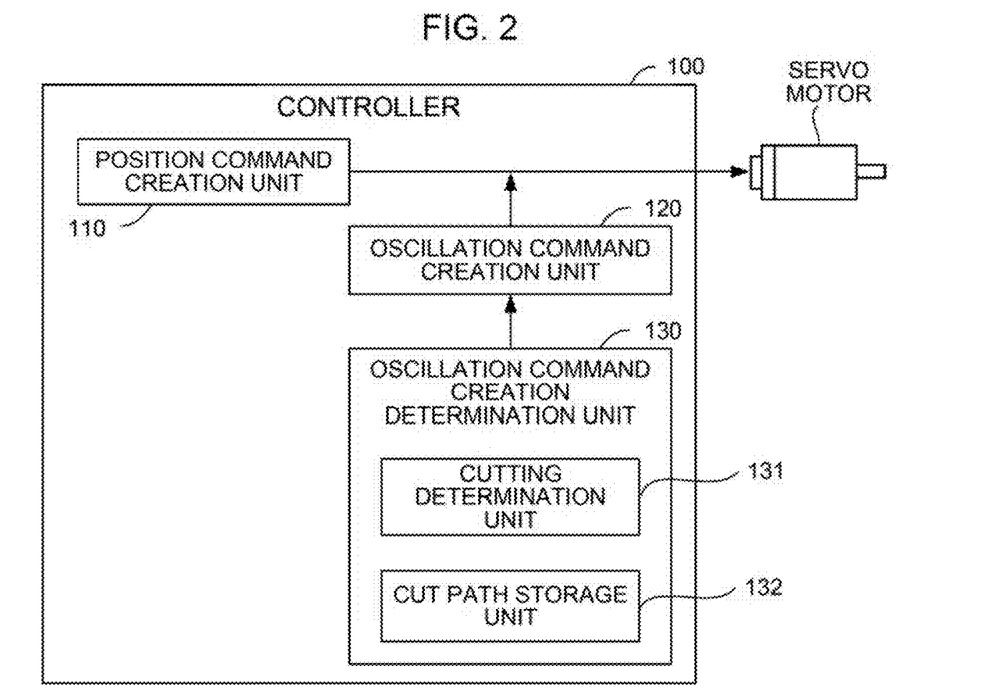
FIG. 2 is a block diagram showing the functional configuration of a controller according to a first embodiment.

As shown in FIG. 2, the controller 100 according to a first embodiment further includes a cut path storage unit 132 that stores a path of which cutting has been completed (that is, a path traveled by cutting feed from the machining start to the present time) by referring to the analysis result of a machining program by a machining program analysis unit (not shown). The cutting determination unit 131 refers to the analysis result of the machining program and the cut path storage unit 132 and determines whether or not the path being machined according to the oscillation cutting command overlaps with the path of which the cutting has been completed (that is, at least partially matched). If overlapping is determined, the cutting determination unit 131 outputs a determination result indicating that non-cutting is being performed. The cutting determination unit 131 repeatedly performs the above processing at a constant cycle, so that, as a determination result, "non-cutting" is output while passing through a path overlapping with a path of which cutting has already been completed and "cutting" is output while an uncut path is machined.

Accordingly, the oscillation command creation determination unit 130 stops the creation of an oscillation command by the oscillation command creation unit 120 while passing through a path overlapping with a path of which cutting has already been completed and permits the creation of an oscillation command by the oscillation command creation unit 120 while machining an uncut path. Therefore, the controller 100 stops oscillation cutting (becoming a normal cutting feed) while passing through a path overlapping with a path of which cutting has already been completed and performs oscillation cutting while machining an uncut path.

Using FIG. 3, a difference in operation between the conventional controller and the controller 100 in the first embodiment will be described.

Figure 3:
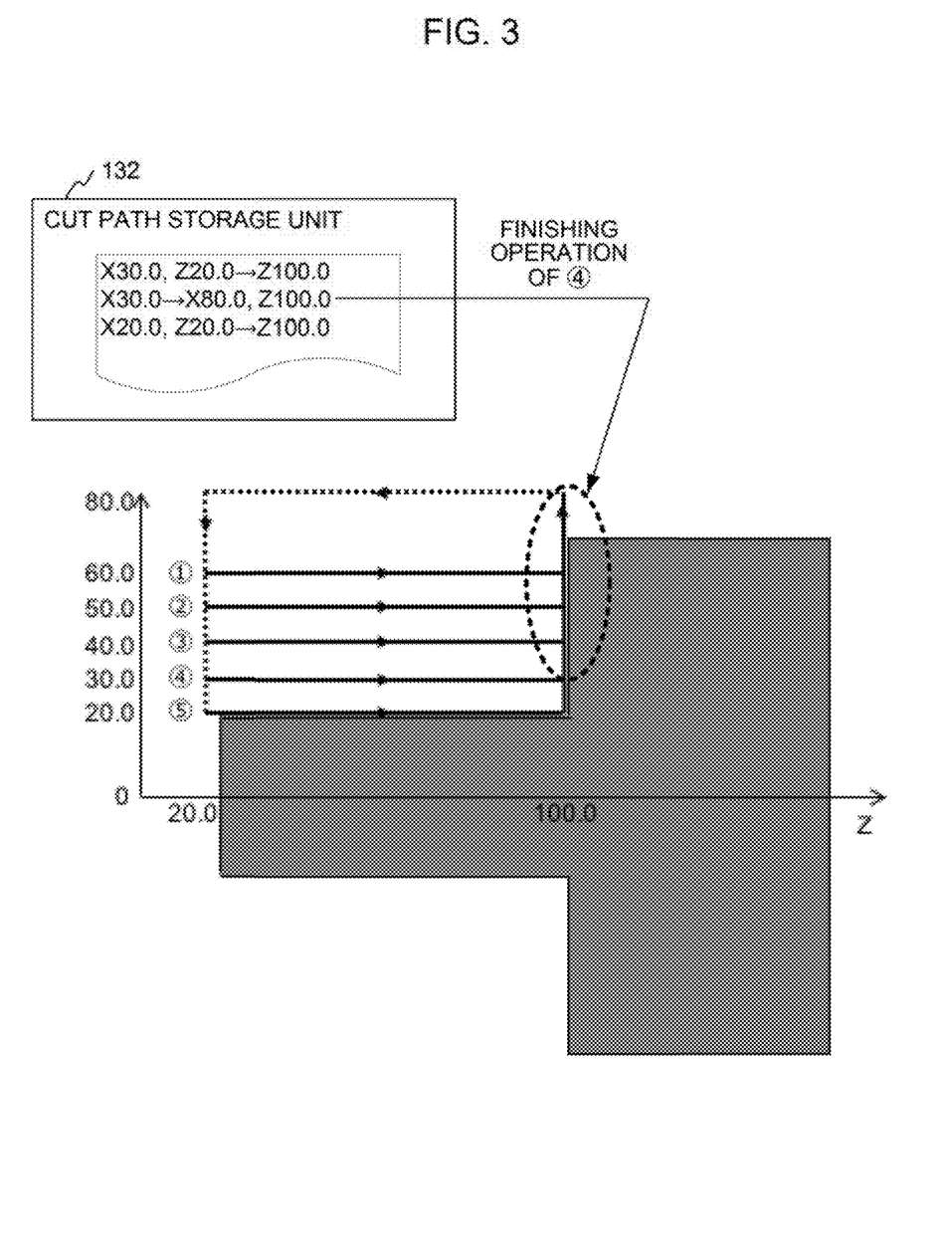
FIG. 3 is a diagram showing an operation of the controller according to the first embodiment.

In the example of FIG. 3, it is assumed that the controller traces the paths from No. 1 to No. 5 in order to perform cutting. The path (X30.0→X80.0, Z100) enclosed by a dashed line circle is a portion where the cutting is completed when an upward cutting operation is completed in machining of No. 4.

In the conventional controller, while the block of oscillation cutting is being executed, the tool is swung even for a path of which cutting has already been completed. Therefore, when performing machining of No. 5, if an oscillation cutting command is issued, the oscillation motion is also performed in the path enclosed by the dashed line circle.

In the first embodiment, on the other hand, the path (X30.0→X80.0, Z100) enclosed by the dashed line circle is stored in the cut path storage unit 132 when the upward cutting operation of No. 4 is completed. During the execution of the block of oscillation cutting, the controller 100 stops oscillating of the tool on the path stored in the cut path storage unit 132. Therefore, when performing machining of No. 5, even if an oscillation cutting command is issued, the oscillation motion is not performed on the path enclosed by the dashed line circle.

According to the present embodiment, the controller 100 determines whether or not cutting is being performed based on the analysis result of the machining program. Since it can be determined whether or not cutting is being performed without requiring a sensor or the like, unnecessary oscillating can be stopped at low cost.

Second Embodiment

Figure 4:
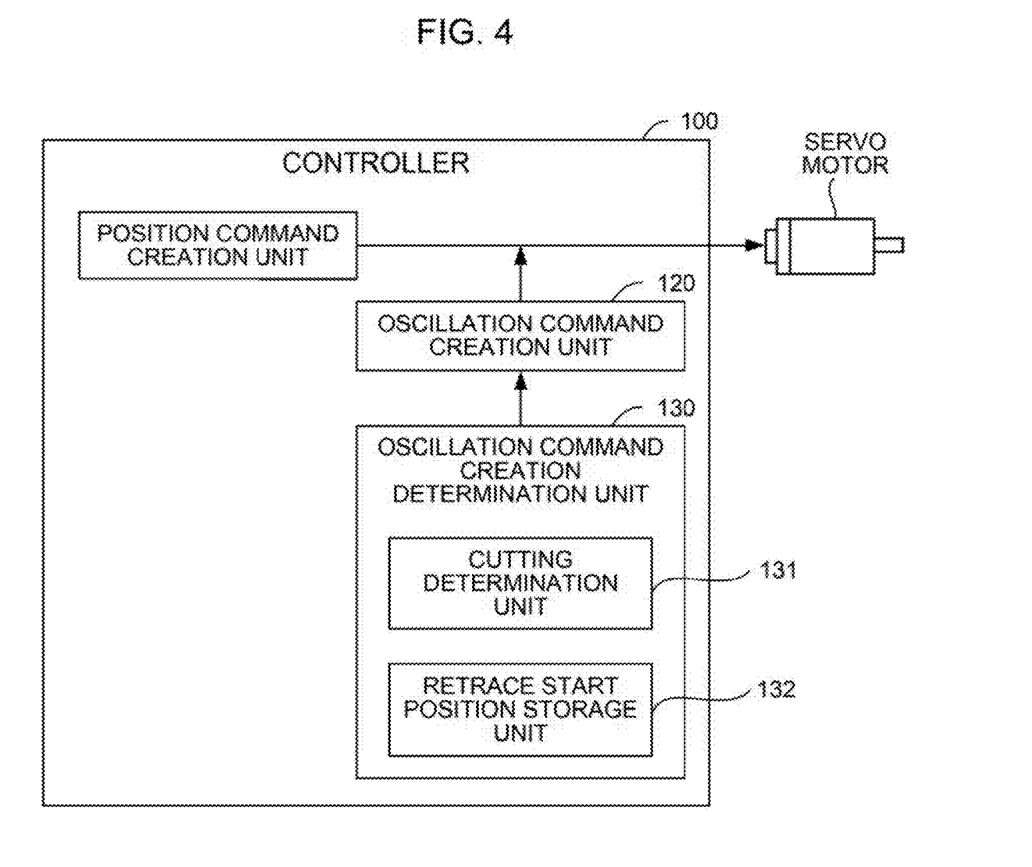
FIG. 4 is a block diagram showing the functional configuration of the controller according to a second embodiment.
Figure 5:
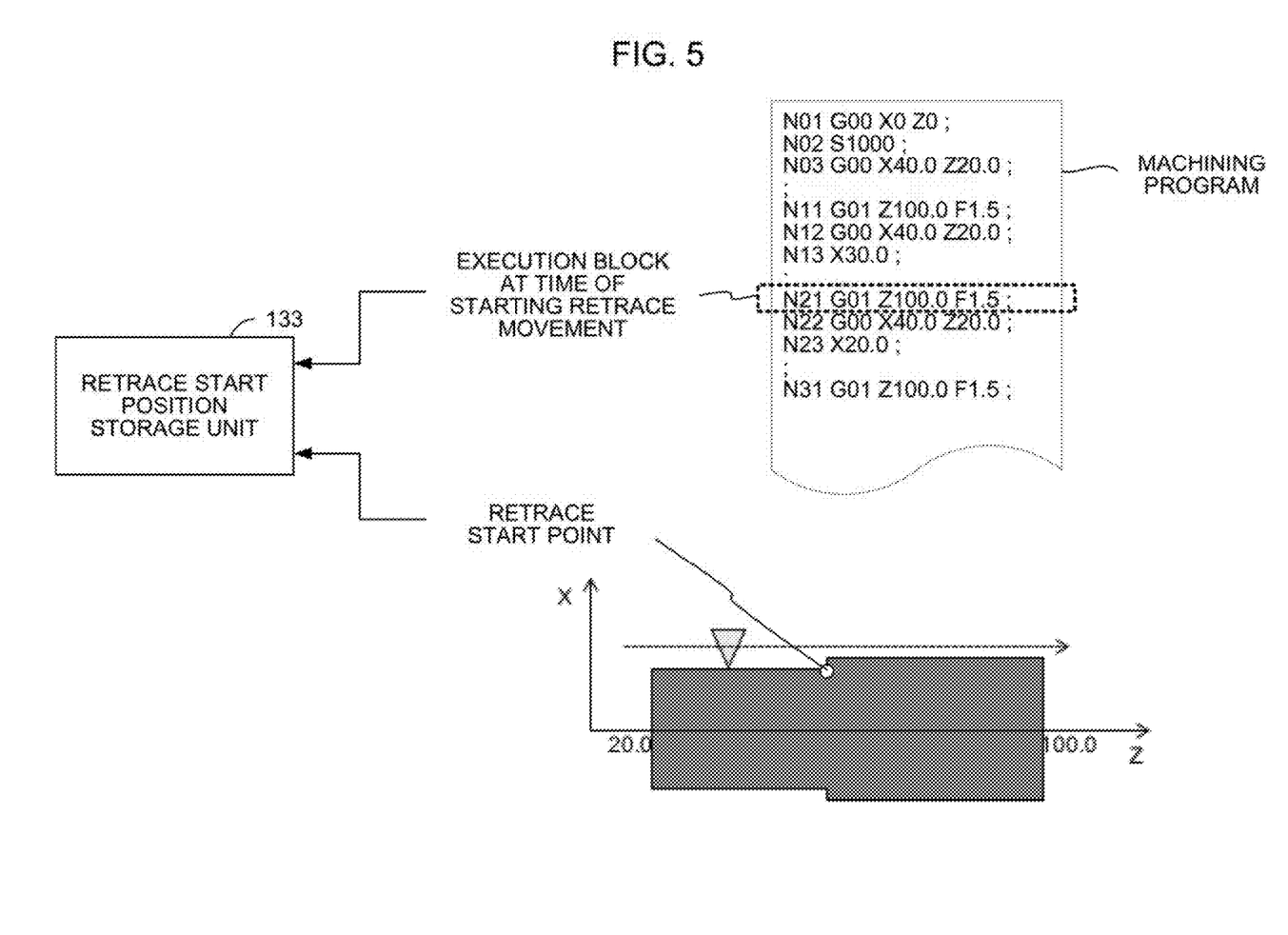
FIG. 5 is a diagram showing the operation of the controller according to the second embodiment.

As shown in FIG. 4, the controller 100 according to a second embodiment further includes a retrace start position storage unit 133 that stores, when retrace is performed, the block number of the machining program that has been executed at that time and the machine coordinate value of the retrace start point. For example, it is assumed that retrace is performed at machine coordinate Z55.0 while the N21 block of the machining program shown in FIG. 5 is being executed. At this point, the retrace start position storage unit 133 stores the block number N21 and the machine coordinate Z55.0.

The cutting determination unit 131 refers to the retrace start position storage unit 133 and calculates a cutting-completed path based on the block number of the machining program being executed and the machine coordinate value of the retrace start point. For example, as shown in FIG. 5, if the block number stored in the retrace start position storage unit 133 is N21 and the machine coordinate is Z55.0, the cutting-completed path can be identified as a portion enclosed by a dashed line circle (X30.0, Z20.0→Z55.0).

Hereinafter, processing can be performed in the same manner as in the first embodiment. That is, the cutting determination unit 131 determines whether or not the path being machined according to the oscillation cutting command overlaps with a cutting-completed path (that is, at least partially matched). If overlapping is determined, the cutting determination unit 131 outputs a determination result indicating that cutting is not being performed.

Figure 6:
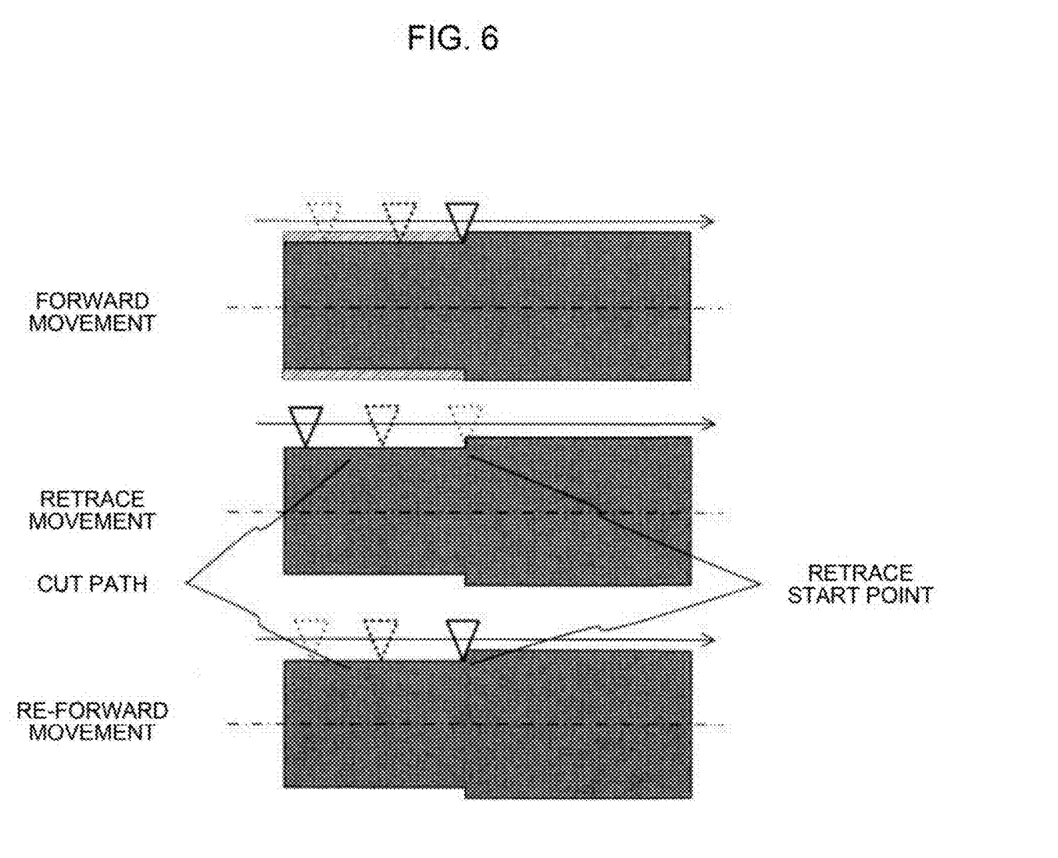
FIG. 6 is a diagram showing the operation of the controller according to the second embodiment.

Using FIG. 6, a difference in operation between the conventional controller and the controller 100 in the second embodiment will be described.

In the conventional controller, while the block of oscillation cutting is being executed, the tool is swung even for a path of which cutting has already been completed. Therefore, even when passing through a cutting-completed path during retrace or re-advancement, the oscillation motion is performed if the oscillation cutting command is issued.

In the second embodiment, on the other hand, information for specifying the cutting-completed path is stored in the retrace start position storage unit 133 when the retrace is performed. During the execution of the block of oscillation cutting, the controller 100 stops oscillating of the tool on the path stored in the cut path storage unit 132. Therefore, no oscillation motion is performed on the cutting-completed path during retrace and re-advancement.

According to the present embodiment, the amount of information to be stored can be suppressed as compared with the first embodiment. Therefore, the controller 100 can make a determination whether cutting is being performed at high speed. Moreover, consumption of the work area can be suppressed.

In the first embodiment and the second embodiment, the timing of stopping oscillating and restarting oscillating can be strictly specified, for example, as follows.

Figure 7:
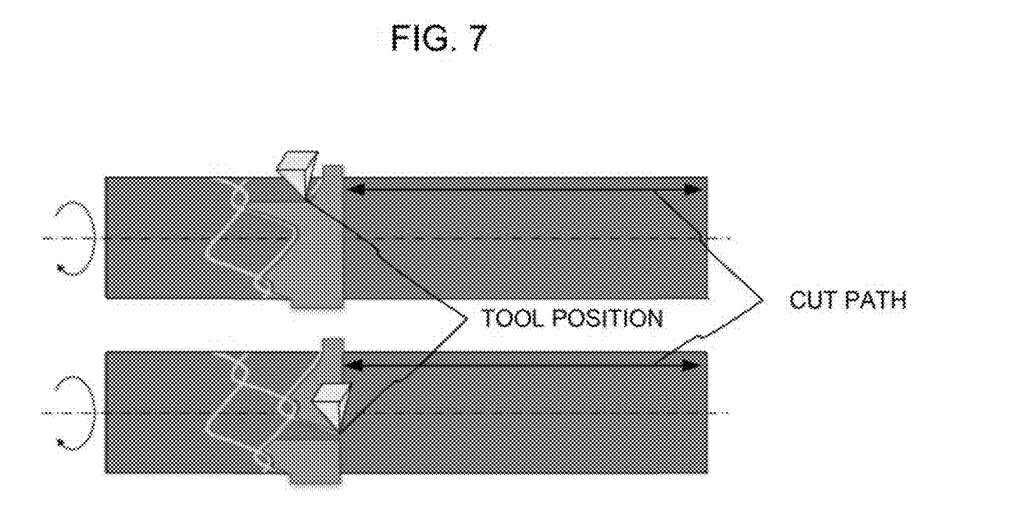
FIG. 7 is a diagram showing the operations of the controllers according to the first and second embodiments.

FIG. 7 shows a method of specifying the timing of stopping oscillating. When the oscillating tool reaches a cutting-completed path even at one point in the circumferential direction of the workpiece (see the lower figure in FIG. 7), the oscillating can be stopped at that point of time. This is because even if the oscillating is stopped at that point, chips are always cut off every time the workpiece makes a turn. Therefore, the timing of the desirable oscillation stop is the time at which the tool position reaches the cutting-completed path.

On the other hand, the timing at which oscillating of the tool is restarted from a stopped state is when the tool position reaches an uncut path.

Third Embodiment

The cutting determination unit 131 according to a third embodiment determines whether or not the tool is actually cutting a workpiece based on a value indicating the state of a machine. The cutting determination unit 131 acquires a value indicating the state of the machine at any time (typically at predetermined time intervals) and determines whether or not cutting is being performed based on the acquired value.

For example, the cutting determination unit 131 acquires feedback from a cutting load sensor attached to a feed axis or a spindle at predetermined time intervals. Generally, it is assumed that the output value of the cutting load sensor during non-cutting is lower than the output value of the cutting load sensor during cutting; therefore, the cutting determination unit 131 determines that a non-cutting state is established when the output value of the cutting load sensor becomes equal to or less than a predetermined threshold value.

Alternatively, the cutting determination unit 131 acquires the current value of the feed axis or the spindle at predetermined time intervals. Generally, it is assumed that the current value during non-cutting is lower than the current value during cutting; therefore, the cutting determination unit 131 determines that a non-cutting state is established when the current value becomes equal to or less than a predetermined threshold value.

Alternatively, the cutting determination unit 131 acquires a position deviation amount, which is a difference between a command position and an actual position of the feed axis, at predetermined time intervals. Generally, it is assumed that a position deviation amount during non-cutting is smaller than a position deviation amount during cutting (it is considered that the position deviation amount increases if the actual speed decreases due to the load during cutting); therefore, the cutting determination unit 131 determines that a non-cutting state is established when the position deviation amount becomes equal to or less than a predetermined threshold value.

Alternatively, the cutting determination unit 131 acquires a difference between a command speed and an actual speed of the spindle, at predetermined time intervals. Generally, it is assumed that a difference between the command speed and the actual speed during non-cutting is smaller than a difference between the command speed and the actual speed during cutting (it is considered that the actual speed decreases due to the load during cutting); therefore, the cutting determination unit 131 determines that a non-cutting state is established when the difference between the command speed and the actual speed becomes equal to or less than a predetermined threshold value.

It should be noted that the cutting determination unit 131 can determine whether or not cutting is being performed by using one of values indicating the state of the above-described machine, and may make a determination by using a plurality of values. Similar determination may be made by using other values indicating the state of the machine.

Figure 8:
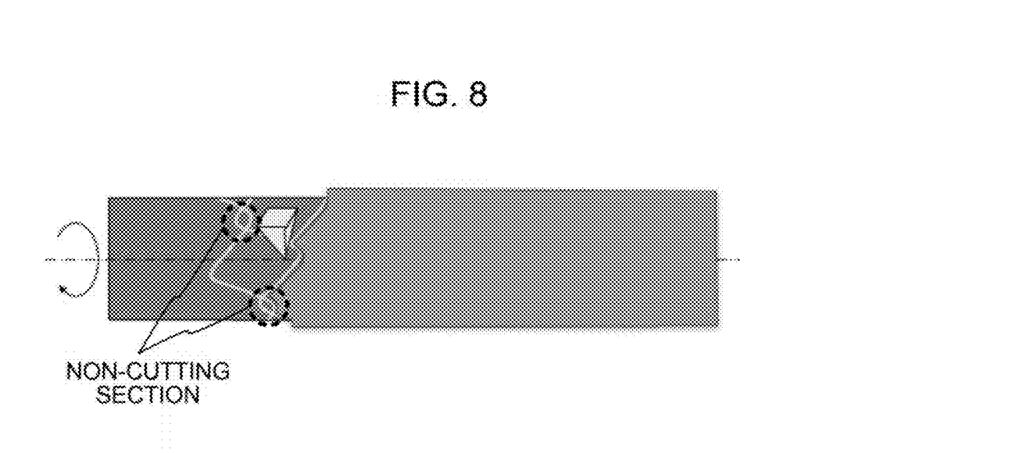
FIG. 8 is a diagram showing the operation of the controller according to a third embodiment.

Incidentally, as shown in FIG. 8, there is always a non-cutting section (a section in which a current tool path and a past tool path intersect with each other and cutting of a workpiece is not performed) during oscillation cutting. According to the method of the third embodiment, it may be incorrectly determined that cutting is not being performed in the non-cutting section so that the oscillation is stopped unexpectedly. Therefore, it is preferable to exclude the non-cutting section from a determination target for determining whether cutting is being performed or not. For example, the cutting determination unit 131 can perform control in a manner such that determination as to whether cutting is being performed or not is not made in the non-cutting section. Since the method for identifying the non-cutting section is a well-known technique, a detailed explanation will be omitted here.

In the foregoing, an embodiment of the present invention has been described, but the present invention is not limited to only examples or embodiments described above and can be carried out in various forms by making appropriate alterations.

For example, in the above-described embodiment, it is assumed that a workpiece rotates and a tool oscillates relative to the workpiece to perform an oscillation cutting; however, the present invention is not limited to this, and it is a matter of course that the present invention is also applicable to a case where the tool rotates and the workpiece oscillates with respect to the tool.

The invention claimed is:

1. A controller that performs oscillation cutting, the controller comprising:
    an oscillation command creation unit that outputs an oscillation command;
    an oscillation command creation determination unit that determines whether or not cutting of a workpiece by a tool is actually being performed, and stops an output of the oscillation command during non-cutting; and
a cut path storage unit that stores a cut path on which cutting has been completed,
wherein the oscillation command creation determination unit stops the output of the oscillation command when a tool path and the cut path overlap with each other.

2. A controller that performs oscillation cutting, the controller comprising:
an oscillation command creation unit that outputs an oscillation command;
an oscillation command creation determination unit that determines whether or not cutting of a workpiece by a tool is actually being performed, and stops an output of the oscillation command during non-cutting; and
a retrace start position storage unit that stores a block number of a machining program being executed at a time of starting backward movement and a coordinate value of a retrace start point,
wherein the oscillation command creation determination unit stops the output of the oscillation command when a tool path and a cut path identified by the block number and the coordinate value overlap with each other.

3. The controller according to claim 1, wherein
the oscillation command creation determination unit stops the output of the oscillation command when a tool position reaches the cut path.

4. A controller that performs oscillation cutting, the controller comprising:
an oscillation command creation unit that outputs an oscillation command; and
an oscillation command creation determination unit that determines whether or not cutting of a workpiece by a tool is actually being performed, and stops an output of the oscillation command during non-cutting,
wherein the oscillation command creation determination unit determines whether or not cutting is actually being performed based on a value of an indication of a cutting load sensor attached to a feed axis or a spindle.

5. A controller that performs oscillation cutting, the controller comprising:
an oscillation command creation unit that outputs an oscillation command; and
an oscillation command creation determination unit that determines whether or not cutting of a workpiece by a tool is actually being performed, and stops an output of the oscillation command during non-cutting,
wherein the oscillation command creation determination unit determines whether or not cutting is actually being performed based on a value indicating a position deviation amount, which is a difference between a command position and an actual position of the feed axis.

6. A controller that performs oscillation cutting, the controller comprising:
an oscillation command creation unit that outputs an oscillation command; and
an oscillation command creation determination unit that determines whether or not cutting of a workpiece by a tool is actually being performed, and stops an output of the oscillation command during non-cutting,
wherein the oscillation command creation determination unit determines whether or not cutting is actually being performed based on a value indicating a difference between a command speed and an actual speed of the spindle.

* * * * *